Figure 1:
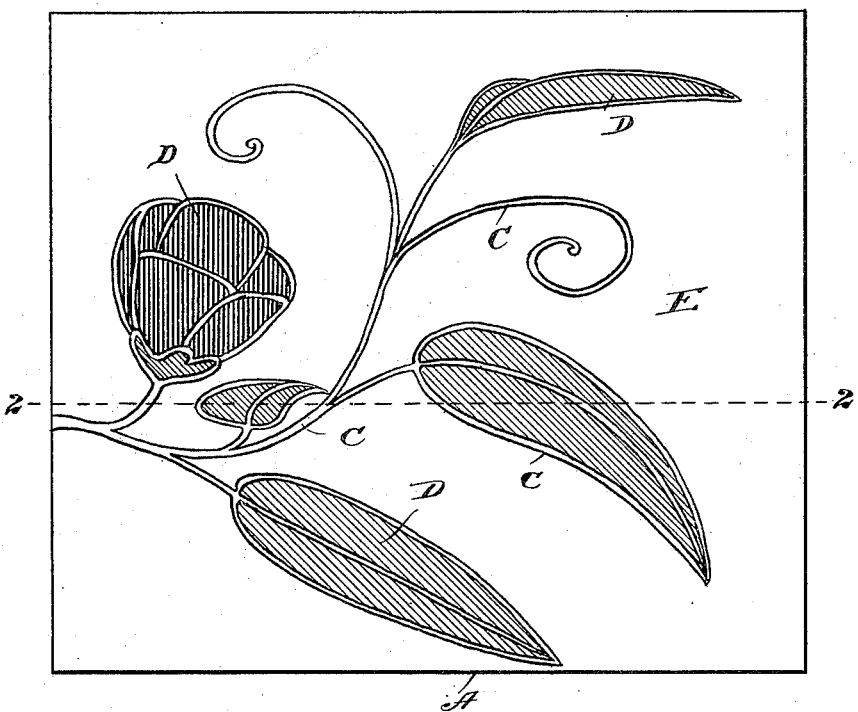

No. 696,392. Patented Mar. 25, 1902.
G. E. CORNER.
ART GLASS AND PROCESS OF MAKING SAME.
(Application filed June 22, 1901.)
(No Model.)

Witnesses,
F. S. Mann,
S. N. Pond.

Inventor,
George E. Corner
By Offield, Towle & Linthicum
Attys.

UNITED STATES PATENT OFFICE.

GEORGE E. CORNER, OF CHICAGO, ILLINOIS, ASSIGNOR OF ONE-HALF TO JOHN P. DIXEY, OF SPRINGFIELD, OHIO.

ART GLASS AND PROCESS OF MAKING SAME.

SPECIFICATION forming part of Letters Patent No. 696,392, dated March 25, 1902.

Application filed June 22, 1901. Serial No. 65,599. (No specimens.)

*To all whom it may concern:*

Be it known that I, GEORGE E. CORNER, a citizen of the United States, residing at Chicago, in the county of Cook and State of Illinois, have invented certain new and useful Improvements in Art Glass and Processes of Making the Same, of which the following is a specification.

My invention relates to the manufacture of art or decorative glass, such as is used to form decorative panels for church and cathedral windows, fire-screens, and the like; and the object of my invention is to produce an artificial glass of the character and for the purposes described which shall be economical to manufacture, ornate and pleasing in appearance, producing a highly-decorative effect, and strong, durable, and lasting in wearing qualities and which shall successfully substitute the use of ordinary stained glass in windows, panels, &c., in the uses above stated.

To this end my invention consists in an art glass and a process of making the same having the characteristics of structure and mode of composition and manufacture all as hereinafter described, and shown in the drawings, and more particularly pointed out in the claims.

My invention and the manner of making the same are illustrated in the accompanying drawings, in which—

Figure 2:
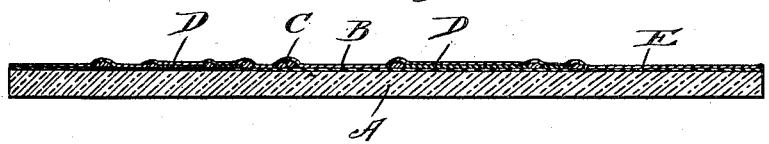

Figure 1 is a plan view of a plate of art glass made in accordance with my invention; and Fig. 2 is a cross-sectional view on the line 2 2 of Fig. 1, showing the constituent elements of my invention and the manner of assembling them.

In carrying out my invention I first take a base of glass or similar transparent material (designated by A in the drawings) cut to the required size and shape for the panel to be decorated. To the upper surface of this glass I next apply an adhesive coating B. This coating B is in the nature of a baking-enamel and is both colorless and transparent, being first applied in a liquid or semiplastic condition and subsequently baked and allowed to cool, which causes it to adhere firmly to the surface of the base. On the surface thus prepared I next apply a series of composition-metal lines C, these lines being laid while in a plastic condition and forming the outlines of the design. A composition which I have found effective and which I preferably use for these lines consists of flux, manganese, litharge, and baking-enamel in substantially equal parts and thoroughly ground together, the enamel serving as a reducer to bring the composition to the liquid or plastic form in which it is applied. The whole is then subjected to another baking operation, the heat of which hardens the metal lines and causes them to adhere with great firmness and tenacity to the adhesive coating B, which latter is slightly softened by the greater degree of heat to which the glass is subjected in this second baking operation. The lines of the design being thus permanently fixed, the desired color effects are next produced by the application of the appropriate pigments (indicated by D) between the metal lines of the design, which pigments may be applied in a liquid state by a brush in the ordinary manner of painting, after which the glass may again be subjected to a moderate artificial heat, if desired, to expedite the drying of the paints. Finally a coating of insulating-varnish E, constituting a protecting-enamel, is applied over the entire surface of the panel thus formed to protect the same from moisture, and when the latter has become thoroughly dry and hard the panel is ready for use.

I claim as my invention—

1. The process of making art glass which consists in coating a transparent base with an adhesive coating, then applying on the latter the raised lines of the design in plastic condition and allowing the same to harden, and then painting in the appropriate pigments between the lines of the design to secure the desired color effects, substantially as set forth.

2. The process of making art glass which consists in coating a transparent base with an adhesive coating, subjecting the base and coating to artificial heat to harden and bake the latter, then applying on such coating the raised lines of the design in plastic condition, then hardening such lines and causing them to adhere to the coating by subjecting the whole again to an artificial heat, and then painting in the appropriate pigments between the lines of the design to secure the desired color effects, substantially as set forth.

3. The process of making art glass which consists in coating a transparent base with a transparent colorless adhesive coating, subjecting such base and coating to artificial heat to harden and bake the latter, then applying on such coating the raised lines of the design in plastic condition, then hardening such lines and causing them to adhere to the coating by subjecting the whole again to an artificial heat, then painting in the appropriate pigments between the lines of the design to secure the desired color effects, and finally coating the whole with a moisture-proof varnish, substantially as set forth.

4. As a new article of manufacture, an art glass consisting of a transparent base, a transparent colorless adhesive coating superposed thereon, composition-metal lines overlying and adhering to said coating and forming the outlines of the design, and suitable pigments disposed over the coating between the metal lines of the design, substantially as described.

5. As a new article of manufacture, an art glass consisting of a glass base, a transparent colorless adhesive coating in the nature of a baking-enamel superposed thereon, composition-metal lines overlying and adhering to said coating and forming the outlines of the design, suitable pigments applied over the coating between the metal lines of the design, and a moisture-proof varnish covering the whole, substantially as described.

GEORGE E. CORNER.

Witnesses:
FREDERICK C. GOODWIN,
SAMUEL N. POND.